United States Patent [19]

McConnell

[11] 4,262,694
[45] Apr. 21, 1981

[54] CENTRAL PIVOT ASSEMBLY FOR A SELF-PROPELLED, CENTER-PIVOT IRRIGATION SYSTEM

[75] Inventor: James R. McConnell, Colorado Springs, Colo.

[73] Assignee: Tumac Industries, Inc., Colorado Springs, Colo.

[21] Appl. No.: 905,338

[22] Filed: May 12, 1978

[51] Int. Cl.³ .............................................. B05B 3/12
[52] U.S. Cl. .................................. 137/580; 137/594; 239/177; 239/710
[58] Field of Search ....................... 137/344, 594, 580; 239/177, 710

[56] References Cited

U.S. PATENT DOCUMENTS

| 2,701,146 | 2/1955 | Warren . | |
|---|---|---|---|
| 2,781,134 | 2/1957 | Weir et al. . | |
| 3,057,646 | 10/1962 | Brumagim . | |
| 3,608,826 | 9/1971 | Reinke . | |
| 3,648,930 | 3/1972 | Brown et al. . | |
| 3,659,627 | 5/1972 | Zimmerer et al. . | |
| 3,690,343 | 9/1972 | Crane | 137/344 |
| 3,750,953 | 8/1973 | Reinke . | |
| 3,782,408 | 1/1974 | Martin . | |
| 3,784,106 | 1/1974 | Ross . | |
| 3,951,165 | 4/1976 | Seger et al. | 137/344 |
| 3,957,291 | 5/1976 | Edling et al. . | |
| 4,095,613 | 6/1978 | Townsend et al. | 137/344 |
| 4,186,763 | 2/1980 | Ferguson et al. | 137/344 |

Primary Examiner—Gerald A. Michalsky
Attorney, Agent, or Firm—Burton & Dorr

[57] ABSTRACT

The present invention involves a central pivot assembly for a self-propelled, center-pivot irrigation system. The assembly includes an hydraulic slip ring arrangement, a pivot arrangement, and a support arrangement for the pivot pipe of the irrigation system. The hydraulic slip arrangement includes first and second concentrically positioned rings which permit hydraulic fluid to continuously flow along out and return paths between a stationary source and the moving, pivot pipe. The pivot arrangement of the present invention includes a pivot bar, sleeve member slideably positioned about the pivot bar and fixedly secured to the pivot pipe, and pillow blocks which slideably receive the ends of the pivot bar. This arrangement allows the pivot pipe to move in vertical planes to accommodate the up and down motion of the distribution pipe as it revolves about the central axis of the system. This arrangement also offers the safety feature that should the pivot bar and one of the sleeve member or pillow blocks freeze up, then the pivot pipe can still move about the pivotal axis. Chains are extended between the outer ring of the hydraulic slip ring arrangement and the stationary, main body of the support arrangement. The ends of the chains are secured substantially in a common planeand the length of each chain is sufficiently long that it hangs loosely when the outer ring is in a neutral position relative to the stationary, main support body.

11 Claims, 8 Drawing Figures

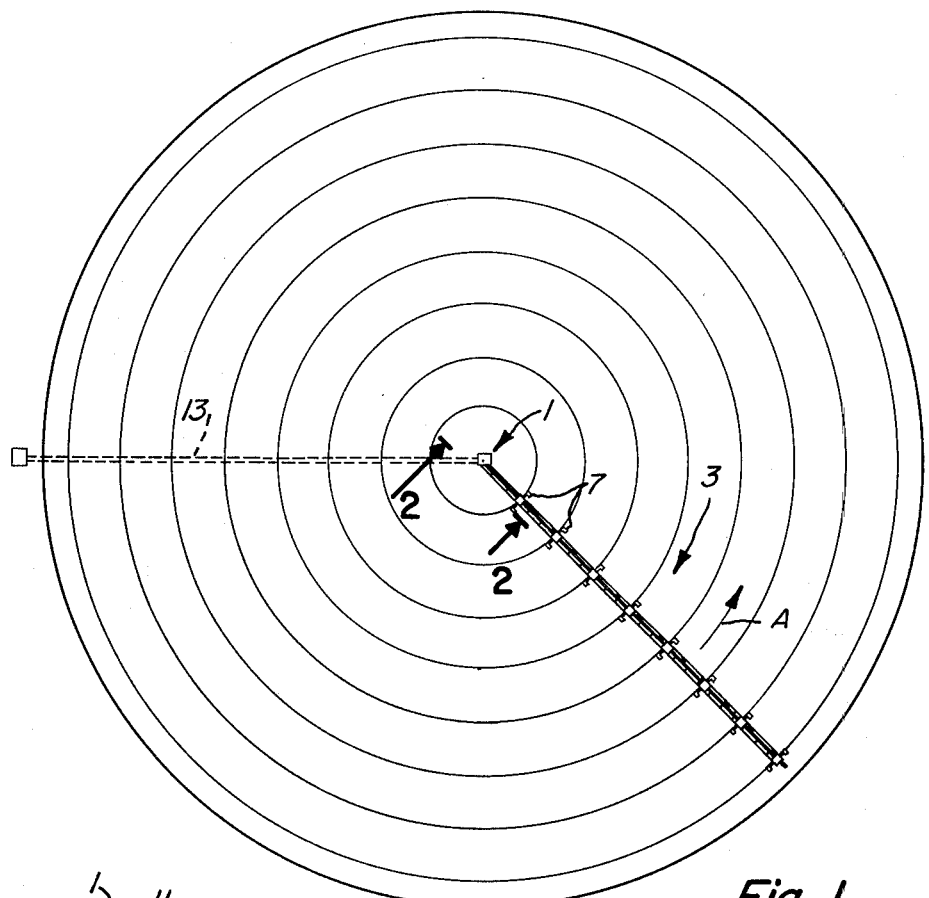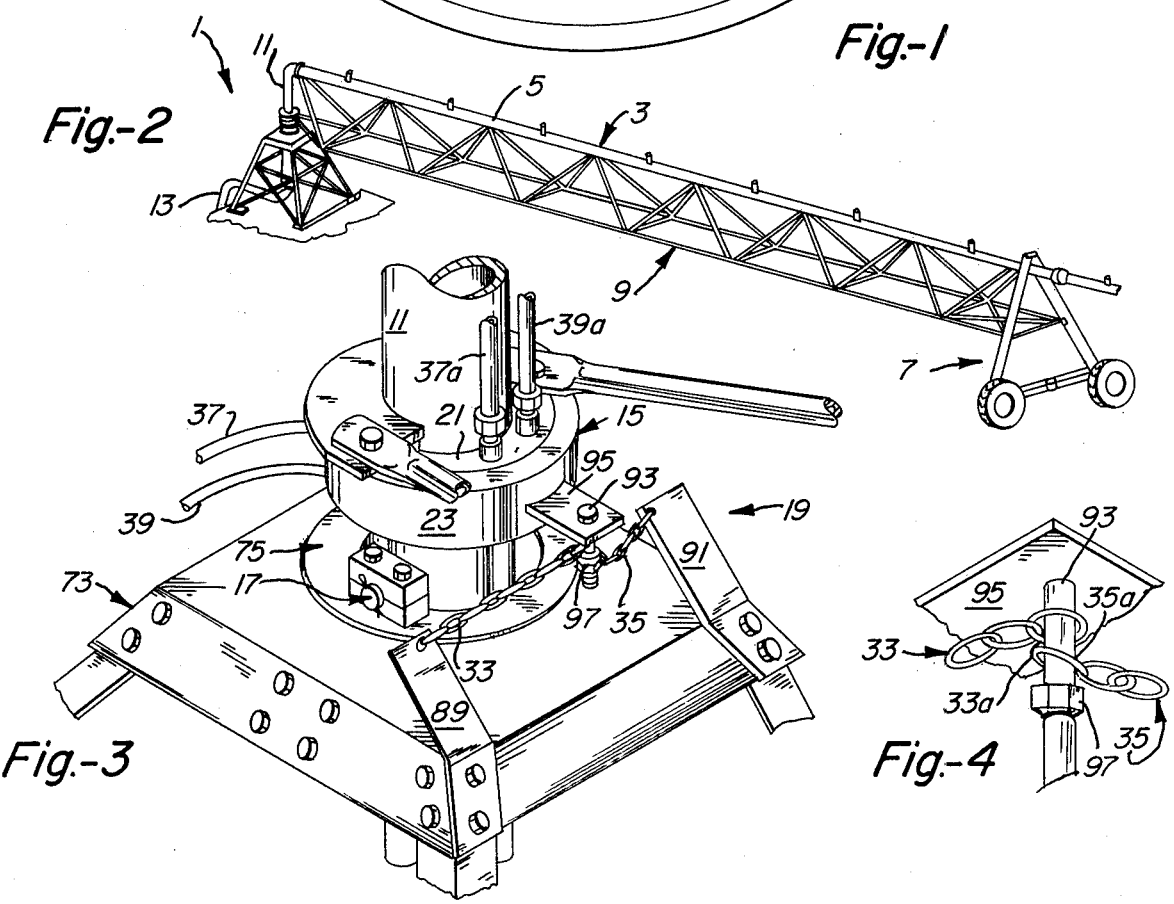

CENTRAL PIVOT ASSEMBLY FOR A SELF-PROPELLED, CENTER-PIVOT IRRIGATION SYSTEM

BACKGROUND OF THE INVENTION

1. Field of the Invention

This invention relates to the field of self-propelled, center-pivot irrigation systems in which a radially extending distribution pipe moves about a central location to apply water over a circular area or a segment of a circular area.

2. Description of the Prior Art

Self-propelled, center-pivot irrigation systems generally comprise a centrally located pivot assembly with an overhead distribution pipe extending horizontally therefrom. The distribution pipe is supported and propelled about the central pivot assembly by a plurality of towers spaced along its length. Each tower has its own drive arrangement which is commonly powered by hydraulic fluid or electricity flowing in lines that extend outwardly from the central pivot assembly. In some systems, the hydraulic or electric lines are merely extended from a source at the central pivot assembly out to the drive motors. With such systems, a problem develops in that the lines will become wrapped around the central pivot assembly upon repeated revolutions of the distribution pipe. An example of such a system is U.S. Pat. No. 3,648,930 Brown et al. issued on Mar. 14, 1972 in which the electric cable extends from an electrical source at the central pivot assembly out to the drive motors for each tower. To avoid having to monitor such systems and periodically unwrap the lines, some arrangements like U.S. Pat. No. 3,784,106 to Ross issued on Jan. 8, 1974 extend the lines upwardly through the center pivot pipe; however, this creates additional problems with maintenance and restricts the flow of water through the pipe.

Several designs for electrically powered irrigation systems have been patented as for examples U.S. Pat. No. 3,659,627 to Zimmerer et al. issued on May 2, 1972, U.S. Pat. No. 3,750,953 to Reinke issued on Aug. 7, 1973, and U.S. Pat. No. 3,782,408 to Martin issued on Jan. 1, 1974. Each of these patented designs enables electricity to be passed from a stationary source to a rotating pipe without restricting the water flow through the pipe and without having any lines wrap around the assembly as the pipe rotates. Hydraulic designs for accomplishing essentially the same result are best illustrated by U.S. Pat. No. 2,781,134 to Weir et al. issued on Feb. 12, 1957 (see his FIGS. 4 and 7) and U.S. Pat. No. 2,701,146 to Warren issued on Feb. 1, 1955.

Self-propelled, center-pivot irrigation systems have one particular problem that has not been satisfactorily overcome to date. This problem occurs when the land to be irrigated is not absolutely flat and involves the torque forces applied to the central pivot assembly as the distribution pipe is moved over the uneven land. Rigid assemblies like Zimmerer, Reinke, Martin, Weir, and Warren cannot adjust to the up and down movement of a distribution pipe with the result that a destructive amount of force can be applied to the central pivot assembly. Such force is particularly harmful to the central pivot assembly of irrigation systems powered by hydraulic fluid because it can separate, weaken, and break the seals between members causing a loss of hydraulic pressure and fluid. Since reliability and durability are key factors in the success of any irrigation system, any breakdowns caused by these forces are directly reflected in lost sales and profits. Ball joint assemblies such as U.S. Pat. No. 3,957,291 to Edling et al. issued on May 18, 1976 which permit limited universal movement are available; however, none will reliably and satisfactorily perform the multiple functions of permitting water to flow from a stationary pipe to a rotating, pivoting pipe while simultaneously permitting hydraulic fluid to flow continuously along separate out and return paths between a stationary source and the same rotating, pivoting pipe. The assembly of the present invention is designed to perform these multiple functions in a reliable and durable manner.

SUMMARY OF THE INVENTION

This invention involves a central pivot assembly for a self-propelled, center-pivot irrigation system. The assembly includes an hydraulic slip ring arrangement, a pivot arrangement, and a support arrangement for the "pivot" pipe. "Pivot" pipe is a term of art in such irrigation systems for the centrally located, upwardly extending conduit that moves with the radially extending distribution pipe about a fixed, vertical axis.

The hydraulic slip ring arrangement of the present invention includes first and second annular rings which are concentrically supported in relation to each other. The inner of the two rings is fixedly attahced to and about the centrally located pivot pipe. The rings have inner and outer mating surfaces with two circular, main channels extending about one of them. Each of the rings further includes two, open-ended channels which are respectively in fluid communication with each main channel.

The pivot arrangement of this invention enables the pivot pipe to move in vertical planes to accommodate up and down motion of the distribution pipe. This arrangement comprises a pivot bar, sleeve member, and two pillow blocks. The pivot bar extends diametrically through the pivot pipe within the sleeve member which is fixed to the pivot pipe and surrounds a central portion of the bar in a sliding relationship. Each end of the bar is slideably supported in a pillow block that is fixedly attached to a movable portion of the support arrangement. The pivot pipe and sleeve member are designed to move relative to the pivot bar; however, should the bar and sleeve member freeze to each other, the pivot pipe can still move about the axis of the pivot bar due to the sliding relationship between the bar and the pillow blocks. This dual sliding feature is designed as a safety factor to insure movement of the pivot pipe about the axis of the pivot bar.

The pivot arrangement is mounted to the support arrangement for movement about a fixed, vertical axis with the pivotal axis thereof remaining in a plane perpendicular to the fixed axis. The support arrangement includes a stationary, main body and a second portion mounted thereto for movement about the fixed axis. The pillow blocks for the pivot bar are secured to this second portion and moved therewith keeping the axis of the bar in a plane perpendicular to the fixed axis. Chains are secured between the outer ring of the hydraulic slip ring arrangement and the stationary, main support body in order to limit the movement of the outer ring about the fixed axis while allowing the pivot pipe to move about the axis of the pivot bar.

With the assembly of the present invention, the pivot pipe can adjust to the up and down movement of the distribution pipe as it moves therewith about the fixed, vertical axis while permitting hydraulic fluid to continuously flow in two directions between the hydraulic slip rings. The assembly of the present invention is simple in design, strong, durable, and reliable.

OBJECTS OF THE INVENTION

It is an object of this invention to provide a novel pivot assembly for a self-propelled, center-pivot irrigation system.

It is an object of this invention to provide a novel pivot assembly which permits the pivot pipe to adjust to the up and down movement of the distribution pipe as it revolves therewith about the central axis.

Another object is to provide a novel pivot assembly which permits the pivot pipe to follow the rotational and pivotal movement of the distribution pipe while permitting hydraulic fluid to continuously flow along out and return paths between the moving pivot pipe and a stationary source.

It is an object to provide a novel pivot assembly that can repeatedly revolve around the central axis without having any power lines wrap around it.

It is an object to provide a novel pivot assembly that is simple in design, strong, durable, and reliable.

Additional objects as well as features and advantages of this invention will become evident from the descriptions set forth hereinafter when considered in conjunction with the accompanying drawings.

BRIEF DESCRIPTION OF THE DRAWINGS

FIG. 1 is an elevated view of the central pivot assembly of the present invention in operation with a self-propelled irrigation system.

FIG. 2 is a perspective view along line 2—2 of FIG. 1 illustrating the central pivot assembly of the present invention as well as the first length of the distribution pipe and the first tower.

FIG. 3 is a perspective view of the central pivot assembly of the present invention illustrating the relationship of the components of the assembly including the chains which extend between two points on the stationary, main body of the support arrangement and the outer ring of the hydraulic slip ring arrangement.

FIG. 4 illustrates the manner in which the ends of the two chains in the preferred embodiment are secured to the outer ring of the hydraulic slip ring arrangement.

DETAILED DESCRIPTION OF THE PREFERRED EMBODIMENTS

Figure 5:
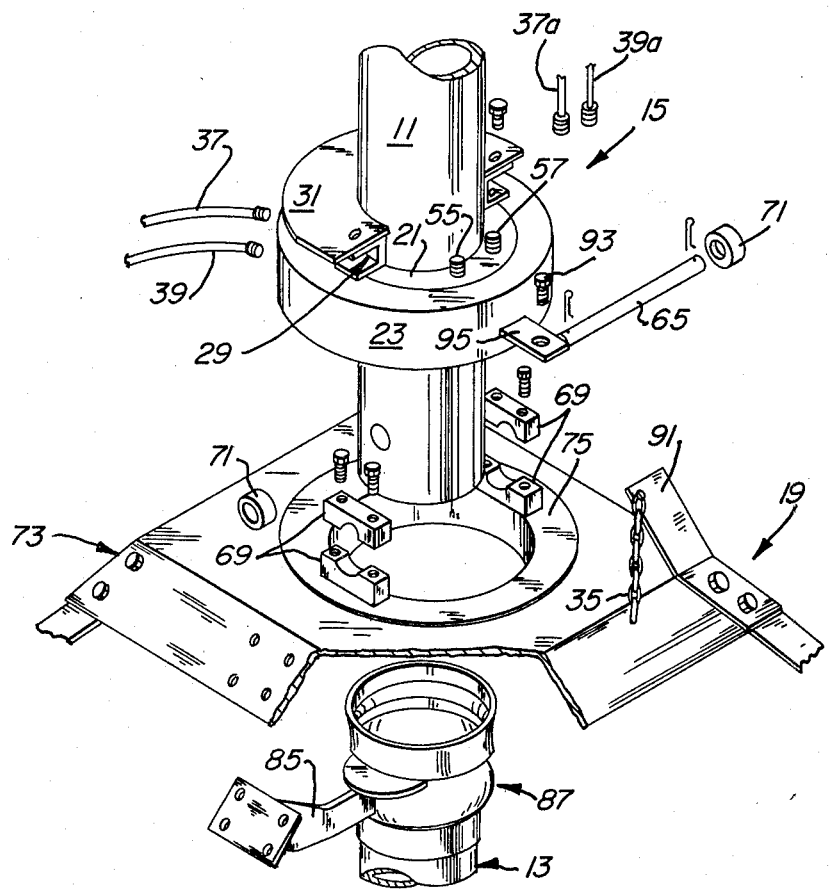
FIG. 5 is an exploded view of the central pivot assembly of the present invention illustrating the main components thereof.

As illustrated in FIGS. 1 and 2, the central pivot assembly 1 of the present invention is designed primarily for use with a self-propelled, center pivot irrigation system. Such systems generally comprise an overhead distribution pipe 3 made up of a plurality of sections or lengths 5 supported between towers 7 by trussing spans 9. The distribution pipe 3 extends radially outwardly from a centrally located, upwardly extending pivot pipe or conduit 11 which is mounted for movement about a substantially vertical axis. Water is supplied to the pivot pipe 11 from stationary water pipe 13 which can be buried if desired. Each tower 7 has its own fluid drive arrangement which is powered by hydraulic fluid flowing through lines extending from a stationary source near the central pivot assembly 1.

Figure 6:
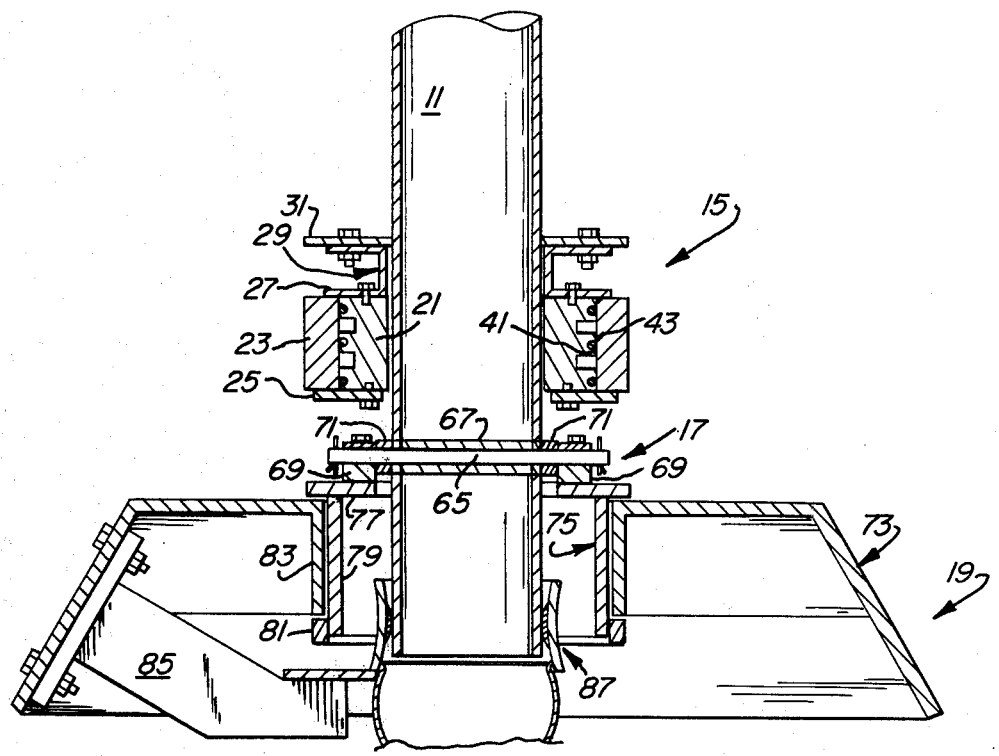
FIG. 6 is a cross-sectional view of the central pivot assembly of the present invention.
Figure 7:
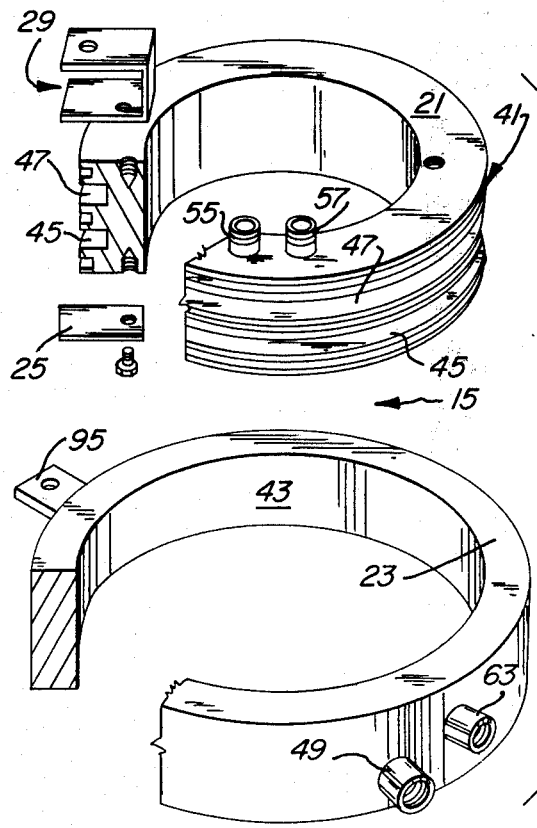
FIG. 7 is an exploded view of the hydraulic slip ring arrangement of the present invention.
Figure 8:
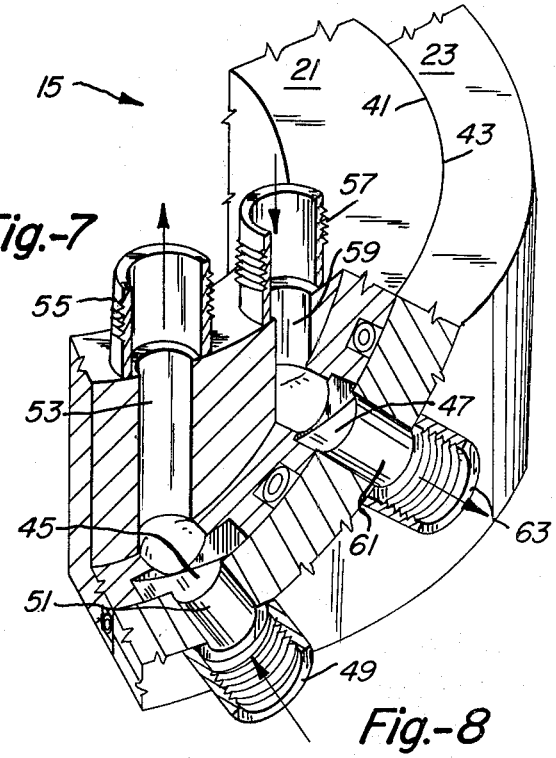
FIG. 8 is a perspective view of a section of the hydraulic slip ring arrangement with parts cut away to illustrate the fluid flow paths between the inner and outer rings of the arrangement.

The central pivot assembly 1 of the present invention includes an hydraulic slip ring arrangement 15, a pivot arrangement 17 for the pivot pipe 11, and a support arrangement 19. The hydraulic slip arrangement 15 as best seen in FIGS. 6–8 has inner and outer annular rings 21 and 23 which are concentrically supported in relation to each other by member 25 and flange 27 of U-shaped member 29. Inner ring 21 is fixedly attached to and about the pivot pipe 11 by member 29 and flange 31 with the axes of symmetry of the ring 21 and the pipe 11 substantially aligned. Inner ring 21 moves with pivot pipe 11 at all times while chains 33 and 35 in FIGS. 3–5 limit the movement of the outer ring 23 to a predetermined area. Outgoing and returning hydraulic fluid lines 37 and 39 in FIGS. 3 and 5 are connected between the outer ring 23 and a stationary source (not shown) such as an hydraulic motor positioned near the central pivot assembly 1. Outgoing and returning hydraulic fluid lines 37a and 39a in FIGS. 3 and 5 are connected between inner ring 21 which moves with the pivot pipe 11 and the hydraulic drive arrangements on the towers 7. It is contemplated that ring 23 could be fixedly attached to pipe 11 and the movement of ring 21 limited by chains 33 and 35, however, the reverse relationship is preferred.

Inner and outer rings 21 and 23 have mating surfaces 41 and 43 as illustrated in FIGS. 6–8. Main flow channels 45 and 47 preferably extend about the surface 41 but could be formed in surface 43 or in both surfaces 41 and 43. Preferably, each channel 45 and 47 extends in a common plane. Outgoing fluid from line 37 passes through nipple 49 and straight open-ended channel 51 in outer ring 23 to the main channel 45 where it goes out the right-angled, open-ended channel 53 in inner ring 21 through nipple 55 into outgoing fluid line 37a. If channels 51 and 53 are aligned as illustrated in FIG. 8, the flow path is fairly short through the hydraulic slip ring arrangement 15. As the channels 51 and 53 are moved out of alignment, the length of the flow path increases. The return flow path of line 39a, nipple 57, right-angled channel 59, main channel 47, straight channel 61, nipple 63, and line 39 functions in a similar manner. As illustrated in FIG. 8, each of the channels 53 and 59 has two legs that meet at a substantially right angle. With the hydraulic slip ring arrangement 15 of the present invention, hydraulic fluid can continuously flow along out and return lines 37, 37a, 39 and 39a between a stationary source located near the central pivot assembly 1 and the moving, pivot pipe 11. Members 21 and 23 are preferable annularly shaped and supported with their axes of symmetry aligned with each other and the axis of the pipe 11 for ease of manufacture and assembly; however, the axes could be somewhat misaligned and the overall shape of members 21 and 23 could be other than annular as long as the members had cooperating surfaces such as 41 and 43. It is contemplated that hydraulic fluid or other fluid including air could be used and passed to the drive arrangement of the towers 7 along only one flow path through the arrangement 15 with the remaining flow path vented or otherwise bypassing the arrangement 15. The passage of the out and return flow paths through the arrangement 15 is, however, preferred.

The pivot arrangement 17 for the pipe 11 enables the pipe 11 to pivotally move in vertical planes to accomodate up and down movement of the distribution pipe 3 as it moves about the central pivot assembly 1. As best seen in FIG. 6, the pivot arrangement 17 includes a pivot bar 65, sleeve member 67, and pillow blocks 69. The sleeve member 67 extends diametrically across the interior of pipe 11 and is secured thereto. In the preferred embodiment, pivot bar 65 is slideably received both in the sleeve member 67 and in each pillow block 69. Spacers 71 about the pivot bar 65 help to maintain the relative positioning of pipe 11 and pillow blocks 69. In the preferred embodiment, the pipe 11 and sleeve members 67 are primarily designed to move relative to the pivot bar 65; however, should the pivot bar 65 and sleeve member 67 freeze to each other, the pipe 11 can still move about the axis of the pivot bar 65 due to the sliding relationship between the pivot bar 65 and the pillow blocks 69. This dual sliding feature is designed as a safety factor to insure movement of the pipe 11 about the axis of the pivot bar 65 through arcs of 40° or more. The axis of the pivot bar 65 is substantially perpendicular to the axis of the distribution pipe 3 and the axis of symmetry of the pipe 11.

The pivot arrangement 17 is mounted to the support arrangement 19 for movement about a fixed, preferably vertical axis with the pivotal axis of the pivot bar 65 remaining in a plane perpendicular to the fixed axis. Preferably, the axis of symmetry of the pipe 11 intersects this fixed axis at a fixed point therealong. The support arrangement 19 includes a stationary, main body 73 and a second portion 75 mounted thereto for movement about the fixed axis. The pillow blocks 69 for the pivot bar 65 are secured to the second portion 75 and move with it keeping the axis of the pivot bar 65 in a plane perpendicular to the fixed axis. As best seen in FIG. 6, the second portion 75 includes members 77, 79, and 81 which form a U-shape to slideably receive member 83 of the main body 73. The support arrangement 19 also includes support member 85 in FIGS. 5 and 6 for the coupling member 87 which is attached to the stationary water pipe 13 and which will accomodate the movement of the pipe 11 while maintaining a water tight seal.

As best seen in FIGS. 3-5, the chains 33 and 35 are connected between upstanding members 89 and 91 of the main support body 73 and bolt 93 on the flange 95 secured to the outer ring 23 of the hydraulic slip ring arrangement 15. In the preferred embodiment, two chains 33 and 35 are used with the end links 33a and 35a looped about the stem of the bolt 93 above the bolt 97 as illustrated in FIG. 4. The members 33 and 35 could be made of any strong, flexible material and a single chain or flexible member could be used which extended from member 89 to bolt 93 to member 91. It is contemplated that a single rigid rod might also be used which was universally mounted at each end and extended between outer ring 23 and member 89 and 91 or another portion of main body 73. In the preferred embodiment, two chains 33 and 35 are used with the end links thereof supported on members 89, 91, and 93 in a substantially common plane. In the preferred embodiment, each chain 33 and 35 has slack in it when the bolt 93 is positioned midway between members 89 and 91 in order to accomodate the pivotal movement of the pipe 11 about the axis of the pivot bar 65. The symmetry of the chain lengths is preferred, however, as long as one chain has slack in it when the pipe 11 is aligned vertically, the chain arrangement 33 and 35 will be able to accommodate the pivotal movement of the pipe 11 about the axis of the pivot bar 65.

In operation, hydraulic fluid is passed through the hydraulic slip ring arrangement 15 to the drive arrangements on the towers 7 to begin moving the distribution pipe 3 about one central pivot assembly 1 either counterclockwise as in FIG. 1 (see arrow A) or clockwise. At first, the outer ring 23 moves with the inner ring 21 and pipe 11 until one of the chains 33 and 35 is drawn taut as illustrated in FIG. 3. During the entire operation, water is continuously passing from stationary pipe 13, through coupling 87, to pipe 11, and along distribution pipe 3. Hydraulic fluid is also continuously passing through the hydraulic slip ring arrangement 15 along out and return lines 37, 37a, 39, and 39a during the entire operation of the irrigation system. Should the field to be irrigated not be absolutely flat or should the central pivot assembly 1 be set up with the axis of pipe 11 not absolutely vertical, the free end of distribution pipe 3 will move up and down relative to the stationary, main body 73 of the support arrangement 17 as the distribution pipe 3 moves about the central pivot assembly 1. With the assembly 1 of the present invention, the pipe 11 will be able to follow the up and down movement of the distribution pipe 3 by pivoting about the axis of the pivot bar 65 which is always at a substantially right angle to the axis of the distribution pipe 3. In this manner, undue stresses on the assembly 1 resulting from the up and down movement of the distribution pipe 3 can be avoided while still permitting water to continuously pass between the stationary water pipe 13 and the moving pipes 3 and 11 and while still permitting hydraulic fluid to continuously pass between a stationary source and the moving pipes 3 and 11 to the drive arrangements of the moving towers 7.

While several embodiments of the present invention have been described in detail herein, various changes and modifications can be made without departing from the scope of the invention.

I claim:

1. A central pivot assembly for use with a self-propelled, center-pivot irrigation system, said assembly comprising:

a conduit member extending along an axis of symmetry, means for pivotably mounting said conduit member for movement about a pivotal axis, said pivotal axis being substantially perpendicular to said axis of symmetry of said conduit member, means for supporting said pivot means for movement about a fixed axis with said pivotal axis thereof remaining substantially in a plane perpendicular to said fixed axis, first and second substantially annularly shaped members, said first member having an outer surface extending about a first axis of symmetry, said second member having an inner surface extending about a second axis of symmetry and forming a mating surface for the outer surface of said first member, at least one of said inner and outer mating surfaces having a first, main channel extending thereabout, each of said first and second members further having a first, open-ended channel in fluid communication with said first, main channel, means for fixedly attaching at least one of said first and second members to said conduit member with the axis of symmetry of said one of said first and second members substantially aligned with the axis of symmetry of said conduit member, means for supporting said first and second members for movement relative to each other with said inner and outer surfaces in a mating relationship and said first and second axes of symmetry substantially aligned, and, means for limiting the movement of the other of said first and second members about said fixed axis whereby said conduit member and said one of said first and second substantially annularly shaped members affixed thereto are free to move about said fixed axis while movement of said other of said substantially annularly shaped members about said fixed axis is limited and each of said first, open-ended channels remains in constant fluid communication with said first, main channel.

2. The assembly of claim 1 wherein each of said elongated members is longer than one-half of the distance between said first and second locations in order to limit the movement of said other of said first and second members while permitting said conduit member and said one of said first and second substantially annularly shaped members affixed thereto to move about said pivotal and fixed axes.

3. A central pivot assembly for use with a self-propelled, center-pivot irrigation system, said assembly comprising:

a conduit member extending along an axis of symmetry, means for pivotably mounting said conduit member for movement about a pivotal axis, said pivotal axis being substantially perpendicular to said axis of symmetry of said conduit member, means for supporting said pivot means for movement about a fixed axis with said pivotal axis thereof remaining substantially in a plane perpendicular to said fixed axis, said support means including a first portion, a second portion, and means for mounting said second portion to said first portion for movement relative thereto about said fixed axis, said pivot means further including a pivot bar extending through said conduit member along said pivotal axis and end means attached to the second portion of said support means and positioned adjacent each end of said pivot bar for mounting said pivot bar to said second portion of said support means, said pivot means further including means for mounting said pivot bar for pivotal movement relative to at least one of said conduit member and said end means, first and second substantially annularly shaped members, said first member having an outer surface extending about a first axis of symmetry, said second member having an inner surface extending about a second axis of symmetry and forming a mating surface for the outer surface of said first member, at least one of said inner and outer mating surfaces having a first, main channel extending thereabout, each of said first and second members further having a first, openended channel in fluid communication with said first, main channel, means for fixedly attaching a least one of said first and second members to said conduit member with the axis of symmetry of said one of said first and second members substantially aligned with the axis of symmetry of said conduit member, means for supporting said first and second members for movement relative to each other with said inner and outer surfaces in a mating relationship and said first and second axes of symmetry substantially aligned, and, means for limiting the movement of the other of said first and second members about said fixed axis whereby said conduit member and said one of said first and second substantially annularly shaped members affixed thereto are free to move about said fixed axis while movement of said other of said substantially annularly shaped members about said fixed axis is limited and each of said first, open-ended channels remains in constant fluid communication with said first, main channel.

4. The assembly of claim 3 wherein said pivot bar mounting means includes a sleeve member fixedly mounted to said conduit member and extending along said pivotal axis about a central portion of said pivot bar in a sliding relationship therewith whereby said sleeve member and said conduit member can move about said pivotal axis relative to said pivot bar.

5. The assembly of claim 3 wherein said end means includes a pillow block adjacent each end of said pivot bar and said pivot bar mounting means includes a surface on each of said pillow blocks, said surfaces extending respectively about each end of the pivot bar in a sliding relationship therewith whereby said pivot bar can move about said pivotal axis relative to said end means.

6. The assembly of claim 3 wherein said means for mounting said pivot bar for pivotal movement relative to at least one of said conduit member and said end means comprises; first means for mounting said pivot bar for pivotal movement relative to said conduit member and second means for mounting said pivot for pivotal movement relative to said end means.

7. A central pivot assembly for use with a self-propelled, center-pivot irrigation system, said assembly comprising:

a conduit member extending along an axis of symmetry, means for pivotally mounting said conduit member for movement about a pivotal axis, said pivotal axis being substantially perpendicular to said axis of symmetry of said conduit member, means for supporting said pivot means for movement about a fixed axis with said pivotal axis thereof remaining substantially in a plane perpendicular to said fixed axis, said support means including a first portion, a second portion, and means for mounting said second portion to said first portion for movement relative thereto about said fixed axis, first and second substantially annularly shaped members, said first member having an outer surface extending about a first axis of symmetry, said second member having an inner surface extending about a second axis of symmetry and forming a mating surface for the outer surface of said first member, at least one of said inner and outer mating surfaces having a first, main channel extending thereabout, each of said first and second members further having a first, open-ended channel in fluid communication with said first, main channel, means for fixedly attaching at least one of said first and second members to said conduit member with the axis of symmetry of said one of said first and second members substantially aligned with the axis of symmetry of said conduit member, means for supporting said first and second members for movement relative to each other with said inner and outer surfaces in a mating relationship and said first and second axes of symmetry substantially aligned, and, means for limiting the movement of the other of said first and second members about said fixed axis, said limiting means including at least a first elongated member and means for attaching said first elongated member between said first portion of said support means for said pivot means and said other of said first and second substantially annularly shaped members whereby movement of said other of said first and second members about said fixed axis is limited while said conduit member and said one of said first and second members affixed thereto are free to move about said fixed axis.

8. The assembly of claim 7 wherein said limiting means includes a second elongated member, each of said first and second elongated members having two ends and said attaching means attaches one end of each elongated member to said other of said first and second substantially annularly shaped members at a substantially common location and attaches each of the other ends of said elongated members respectively to said first portion of said support means at first and second locations spaced from each other in opposite directions about said fixed axis from said common location.

9. The assembly of claim 8 wherein said common location and said first and second locations are substantially coplanar.

10. The assembly of claim 8 wherein each of said elongated members is longer than one-half of the distance between said first and second locations in order to limit the movement of said other of said first and second members while permitting said conduit member and said one of said first and second substantially annularly shaped members affixed thereto to move about said pivotal and fixed axes.

11. The assembly of claim 8 wherein said elongated member is a chain.

* * * * *